Aug. 11, 1964  C. F. FELTS, SR  3,144,053
DEVICE FOR WIRING BEEHIVE FRAMES
Filed Sept. 13, 1962  4 Sheets-Sheet 1
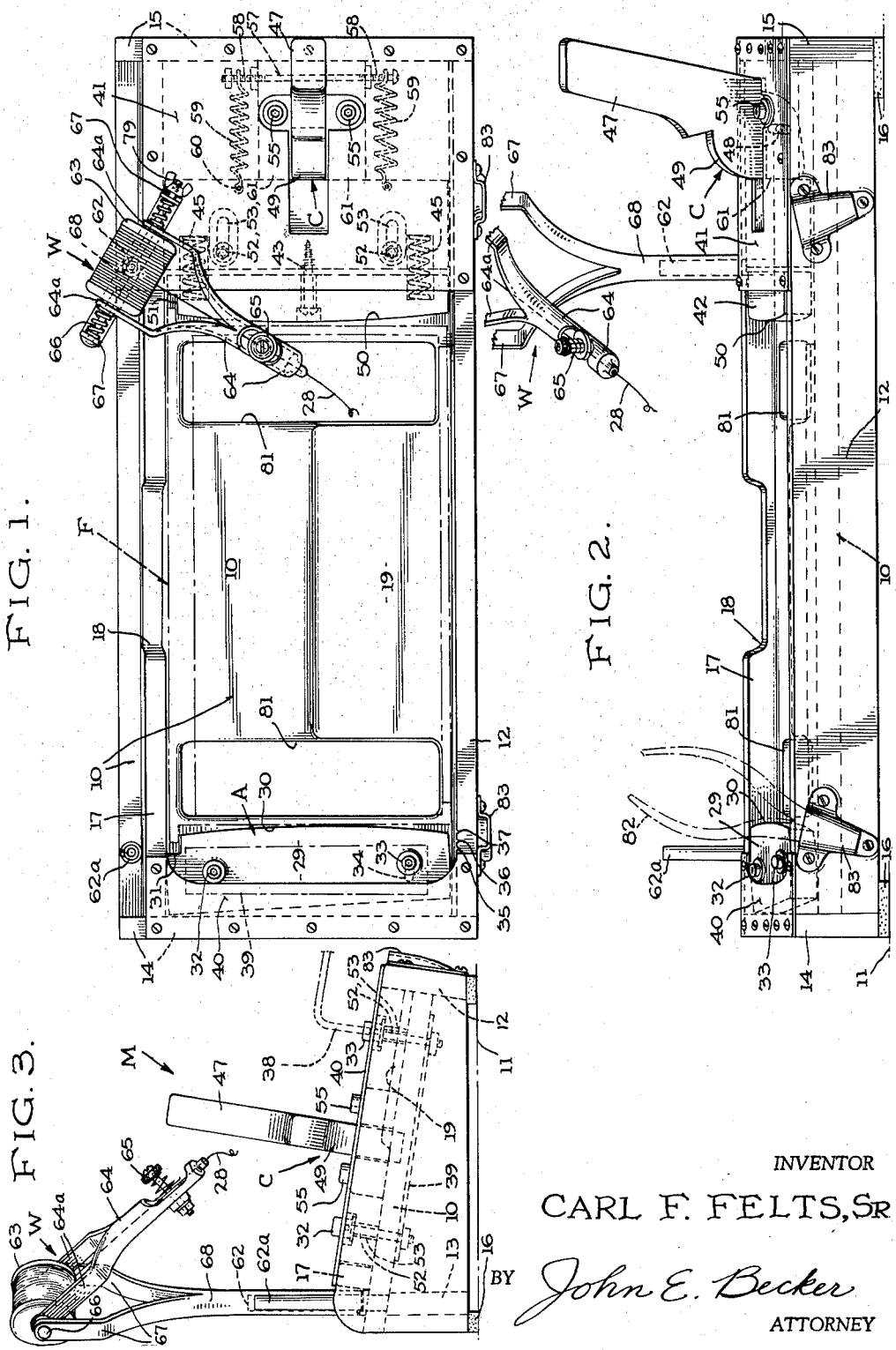
INVENTOR
CARL F. FELTS, SR
BY John E. Becker
ATTORNEY Aug. 11, 1964    C. F. FELTS, SR    3,144,053
DEVICE FOR WIRING BEEHIVE FRAMES
Filed Sept. 13, 1962    4 Sheets-Sheet 2
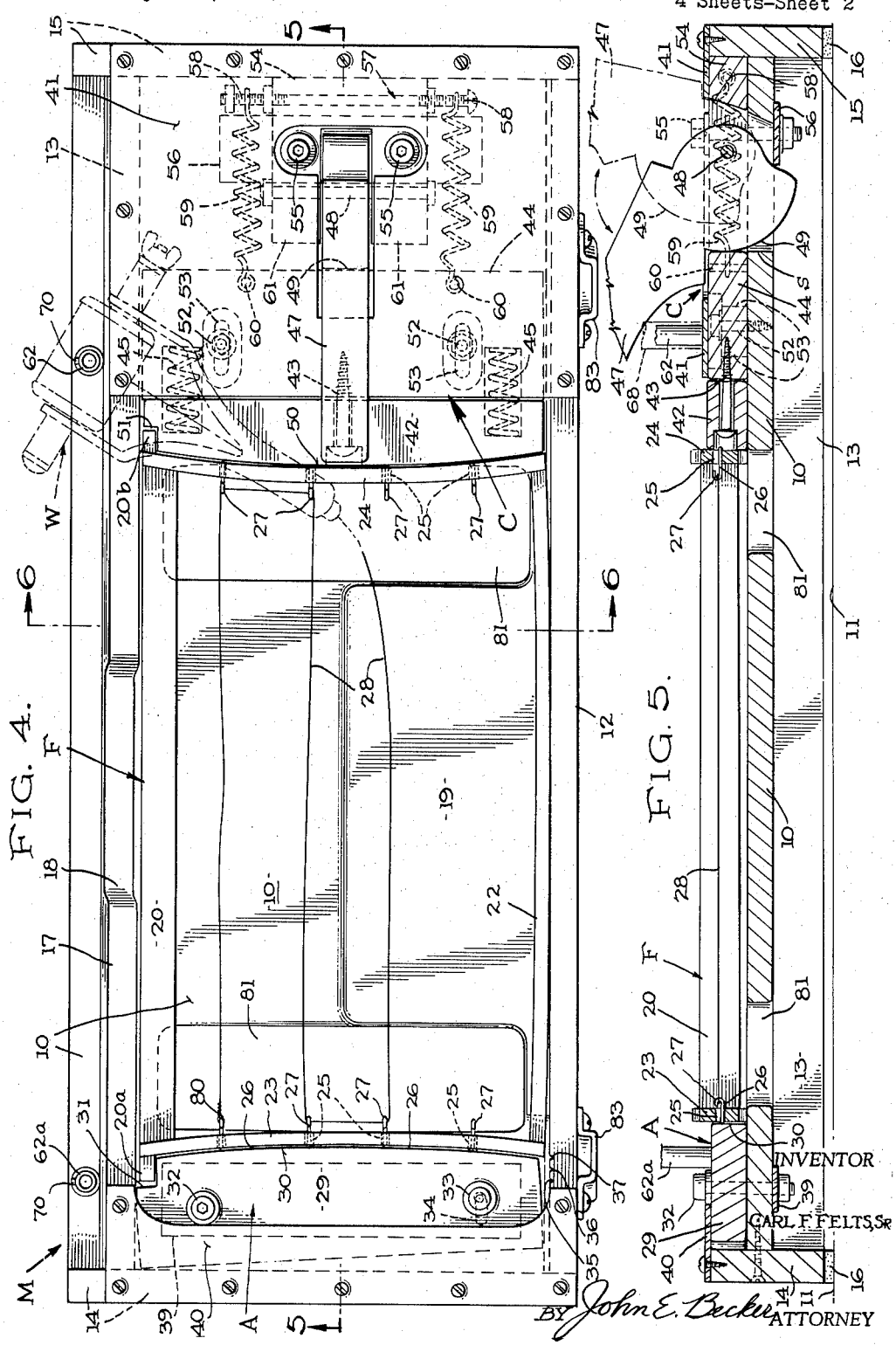
INVENTOR
CARL F. FELTS, SR
BY John E. Becker
ATTORNEY Aug. 11, 1964  C. F. FELTS, SR  3,144,053
DEVICE FOR WIRING BEEHIVE FRAMES
Filed Sept. 13, 1962  4 Sheets-Sheet 3
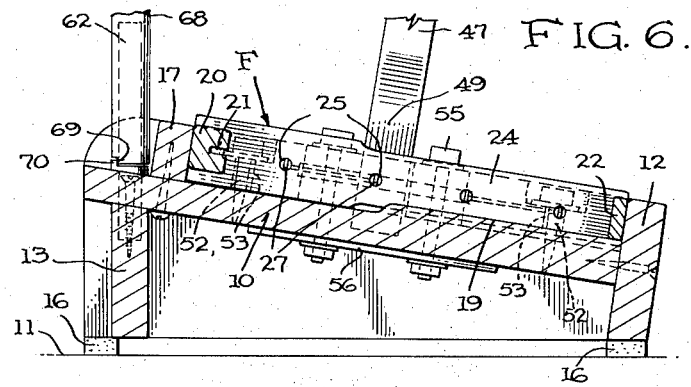
FIG. 6.
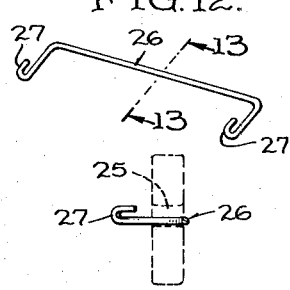
FIG. 12.
FIG. 13.
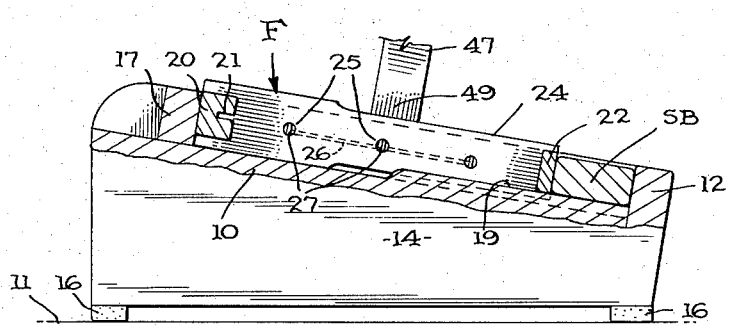
FIG. 7.
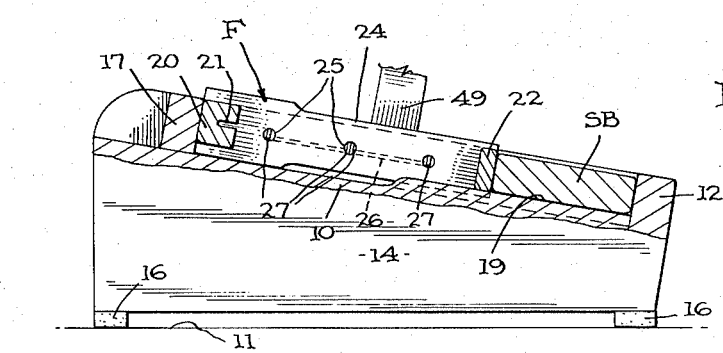
FIG. 9.
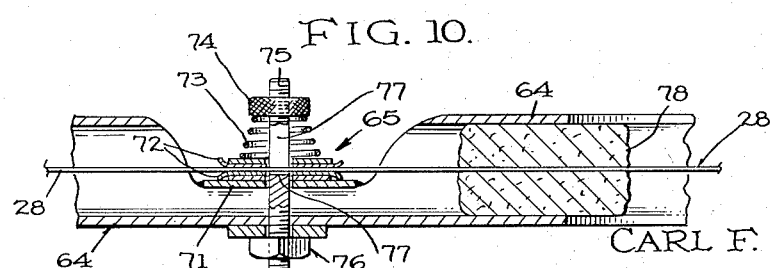
FIG. 10.
INVENTOR
CARL F. FELTS, SR.
BY John E. Becker
ATTORNEY Aug. 11, 1964  C. F. FELTS, SR  3,144,053
DEVICE FOR WIRING BEEHIVE FRAMES
Filed Sept. 13, 1962  4 Sheets-Sheet 4

INVENTOR
CARL F. FELTS, SR.
BY John E. Becker
ATTORNEY

United States Patent Office 3,144,053
Patented Aug. 11, 1964

3,144,053
DEVICE FOR WIRING BEEHIVE FRAMES
Carl F. Felts, Sr., Forest City, Fla.
(Rte. 2, Box 568, Maitland, Fla.)
Filed Sept. 13, 1962, Ser. No. 223,383
14 Claims. (Cl. 140—93)

This invention relates broadly to the bee culture art, and more particularly to improvements in devices for wiring beehive honeycomb frames and to an improved wire clip for said frames. The frames are usually of the type having upper and lower horizontal bars connected together at opposite ends by a pair of spaced vertical end bars which, in turn, generally have a plurality of transverse, spaced, small holes therethrough for the passage of a strand of wire which is used to support an artificial honeycomb base sheet in the frame.

The aforementioned type of honeycomb frames, which are presently in widespread use and which have become available in various sizes, are often wired or strung by a continuous strand of wire which is required to be threaded through the aforementioned openings in the usual wooden end bars, and trained back and forth in a generally parallel manner between the upper and lower bars of the frame. Inasmuch as this strand of wire is necessarily drawn rather taut in order to give proper support to the honeycomb base sheet, the wire which is usually of a fine gauge eventually cuts or becomes embedded in the comparatively soft wood material of the end bars, thus with a resultant sagging or loosening of the wires and thereby requiring unduly frequent tightening thereof.

Therefore, it is a general object of my invention to provide a novelly improved, easily operable and relatively inexpensive device for wiring said frames, whereby novel means are provided to greatly facilitate and expedite said wiring in a manner achieving the optimum stressing or tensioning of the wire strand whereby any potential sagging of the wire is substantially obviated.

More specifically, it is a primary object of this invention to provide an improved wiring device of the aforementioned type, having means for effecting a predetermined and substantially uniform convex flexing of the end bars of the frames while the wiring is being performed, whereupon release of said flexing means will automatically place said wire and frame under the desired optimum tension.

Another object of the invention is to provide an improved wiring device according to the preceding objectives, embodying novel adjustment means whereby honeycomb frames of varying height sizes may be tensioned, each with the proper predetermined amount of flexing during stringing thereof, thus, obviating the risk of overflexing and resultant cracking and/or breaking of said frames.

A further object of the invention is to provide a wiring device of the aforementioned character which is readily adaptable to be operated by either right-handed or left-handed operators.

Still another object is to provide an improved honeycomb or brood frame of the aforementioned general type which utilizes a plurality of novel dual-hooked wire clips which are removably insertable through preformed spaced apertures provided in the opposed end bars of the frames, thus obviating the necessity of threading a comb-foundation supporting wire through said apertures, which heretofore often has been a common practice.

Yet another object of the invention is to provide an improved wiring device and associated frames according to the preceding objectives, wherein said wiring devices embody novel structural means for simultaneously effecting both a predetermined convex flexing of the end frame members, as aforesaid, and for firmly positioning the respective dual-hooked wire clips in their correct and most effective places, thereby facilitating more efficient and expeditious wiring of said frames by relatively unskilled workers.

These and other objects and advantages of my invention will be hereinafter described or will become more apparent from a study of the following detailed description, taken in conjunction with the accompanying drawings, and the novel features thereof will be defined in the appended claims.

In the drawings:

FIG. 1 is a top plan view illustrative of my improved adjustable wiring device shown in a non-operative condition;

FIG. 2 is a front elevation of the invention shown in FIG. 1;

FIG. 3 is an elevational view of the invention shown in FIGS. 1 and 2 as viewed from the left-hand side thereof;

FIG. 4 is an enlarged top plan view of my invention, similar to FIG. 1 but showing the device in an operative condition in conjunction with a full size honeycomb frame;

FIG. 5 is a longitudinal cross-sectional view of the device as shown in FIG. 4 as viewed substantially on the line 5—5 thereof;

FIG. 6 is a transverse cross-sectional view of the device as taken on line 6—6 of FIG. 4;

FIG. 7 is a transverse cross-sectional view corresponding generally to that of FIG. 6 but relative to a medium-sized honeycomb frame having a shorter transverse depth or height than that shown in FIG. 6;

FIG. 9 is a transverse cross-sectional view similar to FIGS. 6 and 7 but shown as taken substantially on line 9—9 of FIG. 8;

FIG. 10 is an enlarged longitudinal cross-sectional detail view of the wire tensioning means;

FIG. 12 is an enlarged perspective view illustrative of one of my novel dual-hooked clips; and FIG. 13 is a cross-sectional detail view as taken on line 13—13 of FIG. 12, and shown in conjunction with the phantom outlined apertured side of a honeycomb frame.

Figure 8:
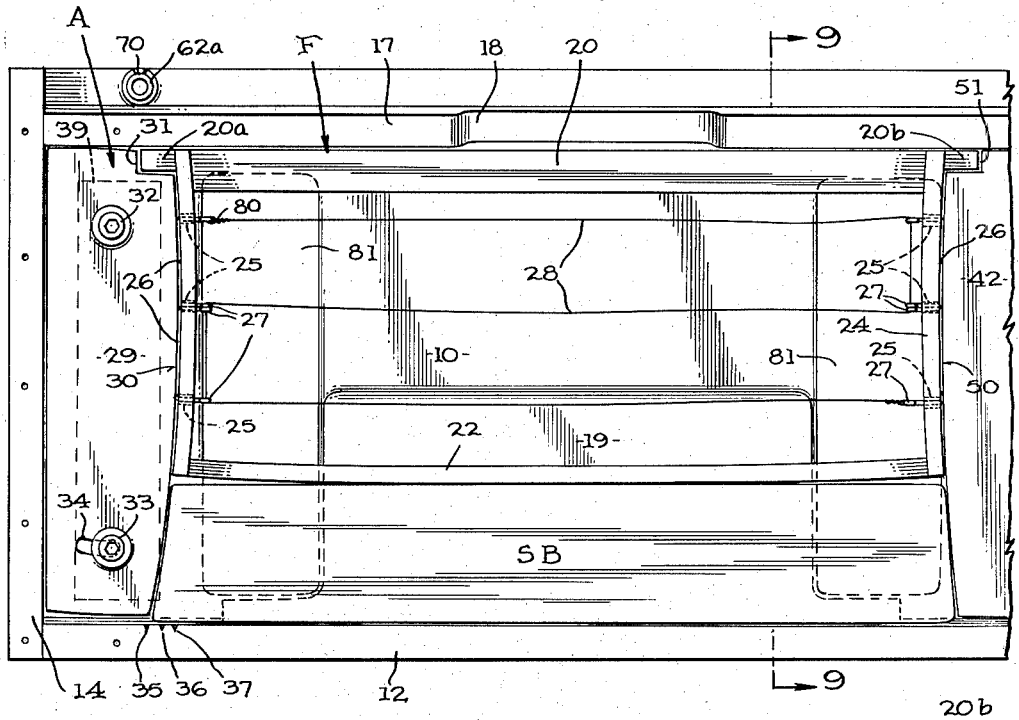
FIG. 8 is an enlarged fragmentary plan view, shown on the same relative scale as that of FIG. 4, of my wiring device, and shown in operation with yet a smaller sized honeycomb frame; and shown with the cover plate removed for better clarity of the adjustment components.

Referring to the illustrative drawings, the present form of the invention or wiring machine is designated generally at M and broadly comprises a base or relatively fixed supporting bed B including novel adjustment means A and adaptable for releasably supporting any one of a selective group of different sized honeycomb or brood frames designated generally at F. The frames F are inwardly compressed or bowed in by novel camming means C, carried by the base B, at their opposite ends or sides a predetermined amount according to the given size of frame being worked upon as afforded by the adjustment means A aforesaid, whereupon the frame F is then releasably conditioned for wiring by the wire and wire spool supporting and tensioning means designated generally at W, said means W also being pivotally and removably carried by the base B.

Referring more specifically to the structural details as shown in the drawings, the base or bed B is of generally rectangular form having a relatively fixed supporting bed member 10 which is shown disposed generally horizontally although slightly canted downward toward the operator relative to a supporting surface 11. The bed member 10, which may also be constructed parallel to surface 11 if desired, is held in its fixed attitude slightly above the surface 11 by a box-like framework having spaced parallel front and rear longitudinal wall members 12 and 13, respectively, and spaced parallel end members 14 and 15. A plurality of rubber or other suitable anti-skid members 16 are preferably provided at the four corners of the device to give it more stability during operational use. The end members 14 and 15, the front member 12 and another rearwardly disposed longitudinal member 17, the latter of which is secured on top of member 10 intermediate the ends 14 and 15, and in spaced parallel relation to member 12 as shown, all extend upwardly above the surface of member 10 preferably to an extent equalling substantially the overall depth thickness of the frames F. The longitudinal members 12 and 17 define the front and back frame-holding or orienting wall members while the end frame-holding and orienting members comprising the adjustment means A and camming means C are adjustably and yieldably mounted as will be described in detail hereinafter. The rearward longitudinal frame orienting member 17 is preferably provided medially thereof with a notched or cutout portion 18 to better facilitate pickup and removal of the frame F by the fingers of the operator.

The bed member 10 is further provided with a raised boss-like shelf area 19 (FIGS. 1, 4, 6, 7 and 9) to support the narrow bottom bar of a typical beehive frame F, to be described in the following.

Figure 11:
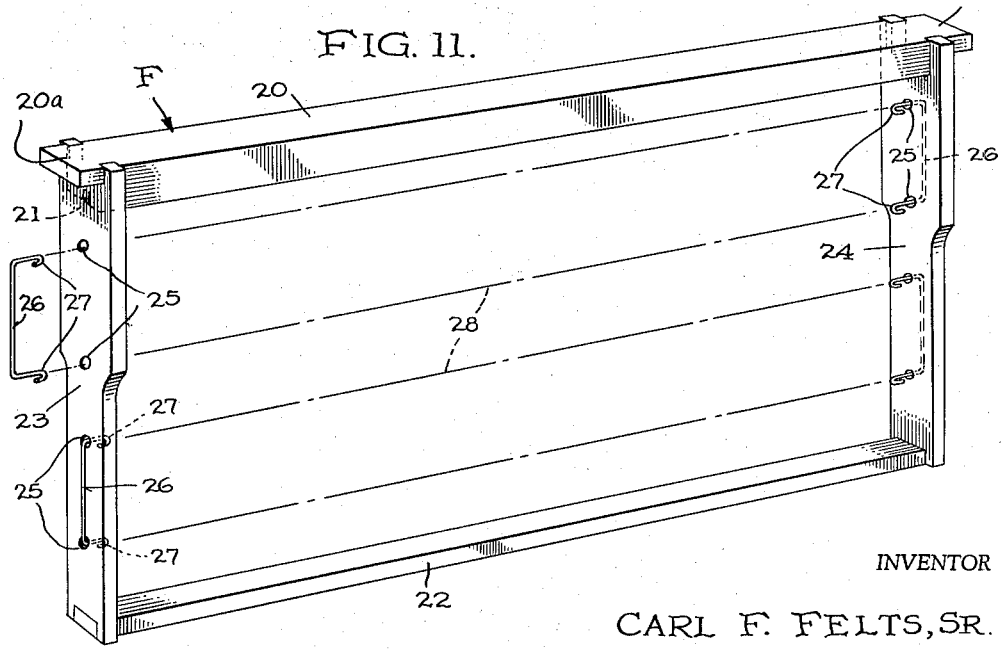
FIG. 11 is an enlarged perspective view of a typical honeycomb or brood frame shown embodying my novel dual-hooked wire clips for expediting wiring of said frames.

A typical frame F, as illustrated in FIG. 11, comprises a relatively rigid longitudinal top bar 20 having a longitudinally extended slot 21 (see FIGS. 6, 7 and 9) along its innermost side for receiving a comb, not shown, and a relatively flexible and less deep or narrower bottom bar 22, said bars 20 and 22 being joined together by a pair of identical, stepped, and relatively flexible opposed end or side bars 23 and 24. The frame F is suspended within a beehive by means of the top bar and the projecting ends 20a and 20b thereof. The side bars 23 and 24 are provided with usually uniformly spaced and oppositely aligned apertures 25 through which a comb supporting wire is often threaded in parallel formation and secured to either of the end bars. However, as an improved adjunct to the overall invention yet to be fully described, I have devised a novel wire clip 26 fabricated of a short length of wire or other suitable material of substantially heavier gauge than the wire to be used to support the comb, so as to preclude any substantial cutting or wearing of the clips body into the body material of the side or end bars 22 and 24 after assembly therewith. The clip 26 has both ends of its wire body terminating in small dual hooks or catches 27, 27 which are preformed a predetermined distance apart corresponding to the distance between adjacent spaced holes 25, and are of a size small enough to readily permit their insertion through said holes 25, in the manner illustrated in the accompanying drawings. The said hooks 27 preferably face or open upwardly toward the operator to better facilitate the hooking thereover of threading wire 28 during use of my improved wiring device or machine M.

Continuing with the detailed description of the wiring machine M, the adjustment means A, which selectively provides the predetermined inwardly directed bowing or compressing of the lefthand side or end of the frame F, comprises an adjustable pressure pad or block 29 disposed in a pivotally slidable manner upon bed member 10 at the left-hand end thereof, as illustrated in the drawings, and as better seen in FIGS. 1, 4 and 8. The block 29 is of a size to fit between walls 12 and 17 and adjacent wall 14 in any given pivotal position and is provided with a large arcuate edge 30 having a notched corner 31 to loosely receive end 20a of frame bar 20, said edge 30 being adaptable to complementally compress or bow the adjacently disposed side bar 23 of a given size frame F when the latter is forced thereagainst responsive to the camming or compression means C, to be described in detail hereinafter. A releasable mounting bolt 32 serves as the pivot point about which the block 29 has limited adjustable movement, while a second releasable mounting bolt 33 cooperates with a slot 34 provided in block 29. The desired setting of the block 29 is achieved by moving said block 29 to one of the selective predetermined indicia settings indicated at 35, 36 or 37 corresponding to a particular size frame F to be wired. For example, to achieve the proper preflexing, bowing or camming of the largest size frame, the block 29 is positioned so that the lowermost point of the arcuate edge 30 aligns with the notch or indicia setting designated 37, whereas when block 29 is correspondingly aligned in similar fashion to indicia mark 36, or to indicia mark 35, then the settings would accommodate an intermediate size frame or a still smaller size frame, respectively, as better illustrated in FIGS. 4, 6, 7, 8 and 9. After the block 29 has been appropriately set, the mounting bolts 32 and 33 are tightened by means of an appropriate tool 38, shown as an Allen wrench in FIG. 3, said bolts having threaded shank ends for tightening within a complementally tapped anchor plate 39 carried beneath the bed member 10, or within complemental nuts (not shown) disposed in bearing relationship against said plate 39. A dust cover 40 may be screwed or otherwise removably attached to members 12, 14 and 17, as shown better in FIGS. 1–5, to overlay the block 29, to preclude the accumulation of dust or other foreign articles behind said movable pressure pad or block 29, as well as to give the device a better aesthetic appearance.

The compressing or camming means C, which is disposed at the opposite end of the machine M from that of the adjustment means A aforesaid, is also preferably protected with removable cover plate 41 which protects the moving parts and enhances the looks of the device.

The camming or compression means C is slidably supported on base member 10 and comprises a two-piece yieldably mounted block assembly including an arcuate pressure pad or frame-bowing block 42 which is loosely attached at its midpoint by a connecting pin or screw 43 to an adjacently disposed slidable parent block 44. Pad 42 is further yieldably connected or aligned on each side of the pin 43, and preferably near opposite ends of pad 42 with block 44, by means of a pair of compression springs 45, 45 (FIG. 4) disposed within appropriately aligned recesses formed in both blocks 42 and 44. The compression springs 45, 45 normally hold the block or pad 42 in spaced apart relation to the block 44, as indicated at 46 in FIG. 1, and permits yieldable movement about pin 43 of the curved pressure pad 42 to take up any inadvertant minor variation in the length of the various frames F, responsive to the sliding compressible movement effected by a counter clockwise rotation of the handle 48 about pivot pin 48 of the camming member 49, the latter of which bears against block 44, as best seen in FIGS. 4 and 5. This mounting also affords a canting or lateral tipping action by the pressure pad 42 according to the particular curvature imparted to the side bar 24 by the curved edge 50, depending upon the overall height of the particular size frame F being wired. A notch 51, similar to notch 31, is also provided at the upper end of the curved edge 50 to receive the end 20b of frame bar 20. When a full or largest size of frame F is being used as depicted in FIG. 4, there is no appreciable canting effect of pad 42 because the curvature is substantially uniformly distributed throughout the overall height thereof. It is to be noted that both pressure pads 29 and 42 have substantially the same but opposite curvatures provided on their opposing edges. Therefore, the said canting effect would take place when frames of the smaller two sizes are being worked upon. Furthermore, when the smaller sized frames are being wired, suitable spacer blocks SB of predetermined size, corresponding to the needs of the particular size frame, are positioned between lowermost bar 22 of the frame and wall member 12 of the base B, as shown in FIG. 8, with their ends preferably adapted to bear against the pressure pads, thereby producing a balanced pressure on the yieldable pressure pad 42 responsive to block SB abutting against the other pressure pad 29.

While a pair of combined hold-down and guide pins 52, 52 are shown affixed to the bed member 10 (FIGS. 1, 3, 4, 5 and 6) in conjunction with corresponding guide slots 53, 53 provided in the block 44, for directing stabilized movement of block 44, it is to be understood that the block 44 may be of such dimensions as to slidably fit and be guided between front wall member 12 and rearward wall member 17, with the cover plate 41 serving as a suitable hold-down component for the aforementioned elements during operation, without the need of said pins and slots.

A U-shaped block member 54 is mounted on top of the bed member 10 adjacent the end wall member 15 and secured in any suitable manner, as by a pair of mounting screws or bolts 55, 55 extending through the block 54, the bed member 10 and a tightening plate 56, similar to plate 39 described herein above. Alternately, the block 54 could be made integral with base or bed member 10 if desired. The open part of the U-shaped block is positioned over a similar opening or slot S provided in the bed member 10 (FIG. 5) to accommodate the pivotal mounting therein of the camming member 49, upon the pivot pin 48, which is shown supported by the opposed legs of the U-shaped block 54. An elongated clamping bolt assembly 57, as shown in FIGS. 1, 4 and 5, may be used if desired to reenforce the block 54 to preclude any possibility of splitting or breaking, said bolt having ends thereof extending to form a pair of anchor pins 58, 58 to which one end of each of a pair of recoil or return springs 59, 59 are respectively attached and extended under tension toward block 44 so that their other ends, respectively are attached to said block 44, as by pins 60, 60. Thus, it is apparent that said return springs normally maintain or bias the block 44, and its attached pressure pad 42, to their normally inoperative positions, with block 44 resting against the spaced feet 61, 61 of block 54 (FIGS. 1 and 4). In this inoperative position, the face of the camming member 49 rests only lightly against the adjacent edge of block 44, with the camming member handle 47 disposed in an upright manner.

When it is desired to commence a wiring operation of a frame using this device, a frame containing the wire clips 26 is merely placed upon the fixed bed member in the manner shown, with the end bars 23 and 24 resting upon the bed member 10 and with the bottom bar 22 supported on the raised shelf area 19, to maintain it in the proper attitude. Next, the handle 47 is rotated by the operator in a counter-clockwise direction thereby effecting rotation of the cam 49 about the pivot 48, thus shiftably sliding the block 44 and the curved pressure pad 42 and frame F, as shown in FIG. 4, all over to the left side against the other pre-set curved pressure pad 29. Thus, the resultant uniform inwardly compressing or bowing of the side bars of the frame effects their conforming to the correct predetermined curvatures of the opposed pressure pads 29 and 42, and thereby properly conditions and prestresses the frame for the next step of actual wiring. It is to be noted that the said pressure pads also serve to more positively seat the dual-hooked wire clips tightly and firmly in place in the end bars of the frames so that the heads or major parts of the upwardly opening hooks 27, 27 are sufficiently exposed to the wiring operator, thereby expediting the wiring and hooking of the strand of wire 28 upon the same.

The wiring means W are pivotally and removably disposed for selective interchangeable mounting at either of preferably two spaced standard mounting bases 62 or 62a located upon the longitudinal rearward edge of the bed member 10, thereby facilitating more efficient operation by permitting operation by either right-handed or left-handed operators. The wire 28 is stored upon and manually pulled from a generous size wire supply spool 63, such as a five pound spool of fine gauge piano wire. The supply spool 63, which is also mounted for retardable rotation intermediate a pair of spring-biased arms 64a, 64a of a bifurcated wire-feeding nozzle 64 having adjustable wire-tensioning means 65, is preferably mounted upon a horizontally disposed bolt-and-wing-nut shaft assembly 66 which, in turn, spans and is carried by a pair of spaced, semi-flexible, apertured arms 67, 67 of an upright standard member 68. The standard 68 has a limited pivotal or rotatable movement of approximately 90° about its vertical axis when telescopically mounted upon either of the standard mounting bases 62 or 62a, as provided by the complementary action of an arcuate notch 69 which extends laterally about the vertical axis along a portion of the lower periphery thereof, and whose opposite sides are adaptable for abutting engagement with an upright abutment 70 provided on the peripheral edge of each complemental mounting bases 62 or 62a, respectively. It is to be understood that a similar mounting could be achieved by having the shaft of the standard 68 fit down into either of a pair of complemental shaft bearing recesses or wells provided in bed member 10 at approximately the same aforesaid locations.

The wire-tensioning means 65 maintains a predetermined tension on the wire at all times and precludes undue wire slack from developing in the wired portion of the frame. The wire-tensioning means 65, as illustrated in detail in FIG. 10, is disposed preferably within a recess formed in the nozzle 64, and comprises supporting means 71 for a pair of tension discs 72, 72, a yieldable tensioning means or spring 73 and an adjusting nut 74, all of which are substantially concentrically mounted up a wire-guiding-and-tensioning mounting bolt 75. The bolt 75 is disposed transversely across the diameter of the hollow nozzle 64 and may be either permanently attached as by welding (not shown) or may be removably attached by means of the nut-and-washer assembly 76. Further, the bolt 75 is provided with a slot 77 which is aligned longitudinally with the barrel of the nozzle 64 to accommodate passage of the stringing wire 28 which lies freely within said slot and between the tension cups 72, 72. A wiping packing 78, such as a piece of felt or other suitable material, is also preferably disposed within the nozzle 64, as shown in FIG. 10, to effect removal of any grease, dirt or other impurities which may be thereon, as the wire is pulled from the spool 63 during use.

Also, as previously mentioned, the supply spool of wire 63 is mounted for retardable rotation to preclude any whip-lash of the wire 28 during feeding therefrom. Adjustment for effecting the proper retarding tension thereof is effected by turning the wing nut 79 (FIG. 1) to either apply or release tension on the spool 63 through the spring biased arms 64a, 64a of said nozzle 64 and through the semi-flexible arms 67, 67 of standard 68.

Therefore, when a right-handed operator is using my invention, the wire and wire supporting means W is placed at the right-hand location 62, as shown in FIGS. 1, 2 and 4 of the drawings. The wire 28 is pulled out enough to initially enable the operator to loop and twist or otherwise secure the end of the wire to the uppermost hook in the left-hand corner of the frame as clearly shown at 80 in FIG. 4. Next, the wire is readily strung back and forth over the hooks 27 of the novel clips 26 in parallel fashion as shown in FIG. 4, with the nozzle 64 and wire supply spool 63 freely pivoting back and forth following the stringing movement of the operator's hands, it being understood that the frame F is already in the pre-flexed or pre-stressed condition. The base member 10 is preferably provided with cutout finger-working areas 81, 81 adjacent the pressure pad areas and beneath the wire hook areas to facilitate freer and quicker attachment of the wire 28 upon the hooks 27 during this wiring operation.

When the frame F is completely laced or strung, except for the last hook, the wire 28 is preferably cut by a pair of wire cutters or pliers 82, shown in dotted outline in FIG. 2, said pliers 82 also being used to help initially twist or secure the wire to the first hook at 80; whereupon the pliers may again be used to aid in the securing of the cut end of the wire to the last hook of the frame. Two pliers brackets 83, 83 are disposed at opposite ends of the machine frame as seen in FIG. 2, to be used to hold the pliers or cutters 82 in the most convenient location for either a left-handed or right-handed operator. Similarly, the wiring means W may be readily placed at the left-hand side of the machine to accommodate left-handed operators, thereby increasing the utility of the device.

Upon securement of the wire 28 to the last hook 27, it being understood that it is only necessary for the wire to have been pulled by hand up to a fairly taut but not a completely taut condition, the operator then rotates the handle 47 in a clockwise direction to release the camming pressure on the pressure pads 42 and 29, whereby the resilient end bars strive to return to their normal non-flexed condition, thus automatically tensioning the strand of wire to the predetermined degree of tautness. Removal of the finished wire frame F from the bed 10 of the base B is facilitated by the cutout area 18 in the longitudinal member 17 as described hereinabove, thus readily clearing the machine for commencement of the cycle over again with a new frame.

Reference to FIG. 8 will disclose that in the course of wiring the smallest size frame by use of my invention, it is necessary that one hook 27 of each of the adjacently disposed wire clips 26 share a common aperture 25, thereby giving more universal usage of my novel clips in conjunction with all of the various size frames F. This is desirable in order to preferably maintain the uniform spacing of the parallel disposed wire strands, inasmuch as the basic frame structures are generally provided to the trade with the uniformly spaced apertures 25 in the side bars thereof.

Accordingly, it is apparent from the foregoing description of the combined structural and operational details and characteristics, that this invention achieves all of the objects and advantages thereof as stated in the preamble of this specification.

While specific details of a preferred embodiment have been herein shown and described, the invention is not confined thereto as various changes and alterations may be made without departing from the spirit and scope thereof as defined in the appended claims.

I claim:

1. A device of the character described for wiring different size beehive frames comprising:
   (a) a frame-supporting base adaptable to orient and receive any one of a given size range of beehive frame or the like having semi-flexible, spaced end frame bars,
   (b) adjustment means carried near one end of said base and adaptable for selectively receiving and bowing end bars of frames of varying sizes,
   (c) camming means carried on said base near the end opposite said adjustment means,
   (d) said camming means and adjustment means being operatively co-related for effecting a substantially uniform, predetermined bowing of said end frame bars inwardly toward each other for facilitating the interconnection of the bowed end bars with strands of wire or the like.

2. A device for wiring beehive frames as defined in claim 1 wherein the adjustment means includes
   (a) a movable pressure pad adapted to be locked in one of a plurality of predetermined settings corresponding to given size frame for effecting the inward bowing pressure uniformly along the middle portion of one of the end bars of any selected size frame, and
   (b) locking means for releasably locking said pressure pad in its predetermined setting.

3. A device for wiring beehive frames as defined in claim 1, wherein the adjustment means includes
   (a) a pivotal pressure pad having an arcuate edge disposed to lay substantially in the medial plane of a beehive frame and adjacent to one end bar thereof when it is being wired,
   (b) indicia means on said base adjacent one end of said pressure pad and constituting predetermined settings for different size frames, and
   (c) locking means for releasably locking said pressure pad in a predetermined setting corresponding to the selected size frame.

4. A device of the character described for wiring different size beehive frames comprising:
   (a) a frame-supporting base adaptable to receive any of a given size range beehive frame having semi-flexible, spaced end frame bars provided with spaced hook means therein,
   (b) adjustment means carried at one end of said base and including a pre-settable pressure pad adaptable to engage one end bar of the frame, and
   (c) camming means carried at the other end of said base and including second pressure pad means adaptable to engage the other end bar of said frame,
   (d) said adjustment means and said camming means disposed relative to each other and adaptable to effect a uniform medial and predetermined inward bowing of said end frame bars toward each other for facilitating wired interconnection with the hook means of the bowed end frame bars.

5. A device for wiring beehive frames as defined in claim 4, wherein the camming means comprises:
   (a) an eccentric curvilinear camming block having a handle projecting up from one side thereof, and
   (b) said camming block being pivotally mounted on said base for manual operation and operatively disposed adjacent the second pressure pad means for operative engagement thereagainst.

6. A device for wiring beehive frames as defined in claim 4, wherein the camming means comprises:
   (a) an eccentric curvilinear camming block having an operating handle projecting from one side,
   (b) said camming block being pivotally mounted on said base for manual operation and operatively disposed adjacent the second associated pressure pad means for operative engagement thereagainst, and
   (c) said latter pressure pad means including a composite pressure pad having means to resiliently bias said pad to a normally non-operative condition.

7. A device for wiring beehive frames as defined in claim 4, wherein the camming means comprises:
   (a) an eccentric curvilinear camming block having an operating handle projecting from one side,
   (b) said camming block being pivotally mounted on said base for manual operation and operatively disposed adjacent the second associated pressure pad means for operative engagement thereagainst,
   (c) said latter pressure pad means including a composite pressure pad having means to resiliently bias said pad to a normally non-operative condition, and
   (d) said composite pad further comprising a yieldably mounted forward pad adaptable to directly engage one side bar of the frame, and a rearward adjacently disposed parent pad which is loosely interconnected to said forward pad, and
   (e) said pressure pads being yieldably movable as a unit responsive to camming rotation of said camming block.

8. A device for wiring beehive frames as defined in claim 4, wherein the base is provided with selective wire-supply mounting means near opposite ends of the base, and wiring means carried by said base and adapted to be selectively and removably mounted on said mounting means, thereby better facilitating use by both right-hand and left-hand operators.

9. A device for wiring beehive frames as defined in claim 8, wherein the wiring means comprises
 (a) a supply spool of wire or similar stringing material mounted for retardable rotation,
 (b) a spool-carrying standard provided with a pair of spaced-apart, semi-resilient carrying arms having a spool-carrying shaft supported on said arms,
 (c) resilient means carried on said shaft adjacent each end of the supply spool and intermediate said carrying arms, and
 (d) adjustment means on the shaft for effecting adjustable retardable tension on the supply spool.

10. A device for wiring beehive frames as defined in claim 9, wherein said base and spool-carrying standard are provided with cooperative means to facilitate limited pivotal rotation of said standard about a substantially vertical axis.

11. A device for wiring beehive frames as defined in claim 9, wherein the wiring means further includes
 (a) a wire feed nozzle,
 (b) said nozzle being bifurcated at one end to provide a pair of semi-yieldable mounting arms adapted to straddle the supply spool and movably mounted on said spool shaft for rotation thereabout, and
 (c) said nozzle having a tubular shank at its other end through which the wire is fed during the wiring operation.

12. A device for wiring beehive frames as defined in claim 9, wherein the wiring means further includes
 (a) a wire feed nozzle,
 (b) said nozzle being bifurcated at one end to provide a pair of semi-yieldable mounting arms adapted to straddle the supply spool and movably mounted on said spool shaft for rotation thereabout.
 (c) said nozzle having a tubular shank at its other end through which the wire is fed during the wiring operation, and
 (d) adjustable wire-tensioning means disposed on the shank of said nozzle for maintaining tension on the wire and precluding the formation of undue slack in the wired portion of the frame at any given time during the wiring operation.

13. A device of the character described for pre-stress wiring of different size beehive frames of generally rectangular configuration having semi-flexible, spaced end frame bars interconnecting top and bottom frame bars, comprising:
 (a) a frame-supporting base;
 (b) means on said base for intially orienting any one of a given size range of beehive frames thereon;
 (c) a pair of spaced-apart pressure pads movably mounted upon said base and adaptable to help prestress any one of said frames by cooperatively effecting uniform bowing of the opposite end frame bars inwardly toward each other;
 (d) camming means disposed adjacent one of said pressure pads on said base and adaptable to slidably move and hold said adjacently disposed pressure pad in a releasable predetermined condition to help prestress a frame as aforesaid; and
 (e) wiring means for interconnecting the inwardly bowed side bars of the frame in a manner whereupon the release of the the aforesaid camming means will effect a predetermined stressing of the wired frame.

14. A device for wiring beehive frames as defined in claim 13, wherein said pressure pads are each provided with an elongate arcuate surface disposed in opposed relation to one another and are disposed to lay substantially in the medial plane of a frame to be wired when the latter is laid upon said base.

References Cited in the file of this patent
UNITED STATES PATENTS

| | | |
|---|---|---|
| 639,521 | Carpenter | Dec. 19, 1899 |
| 1,191,052 | Wright | July 11, 1916 |
| 1,486,809 | Starr | Mar. 11, 1924 |
| 1,878,746 | Wolkow | Sept. 20, 1932 |
| 2,708,462 | Frear | May 17, 1955 |
| 2,836,287 | Cady | May 27, 1958 |